Oct. 2, 1951 H. R. HARDING 2,569,989
PRESSURE STOP NUT
Filed July 10, 1950

INVENTOR.
HIRAM R. HARDING.
BY Howard J. Whelan.
ATTORNEY.

Patented Oct. 2, 1951

2,569,989

UNITED STATES PATENT OFFICE 2,569,989

PRESSURE STOP NUT

Hiram R. Harding, Baltimore, Md., assignor of fifty per cent to Harry E. Karr, Baltimore County, Md., and twenty-five per cent to Logan C. Harding, Hopewell, Va.

Application July 10, 1950, Serial No. 172,975

4 Claims. (Cl. 151—19)

This invention relates to bolts and nuts and more particularly to those termed stop nuts.

There have been stop nuts developed and made, that are used to hold a nut in place on a bolt or stud, so it will be held in place indefinitely, and in doing so they avoid the use of a lock nut. In place of the conventional lock nut there have been used in the nut, rubber or other resilient materials of the non-metal class in which the screw threads of the bolt are threaded and on being made tight serve to bind securely on the bolt threads. In this invention, a pressure stop nut is employed and includes an auxiliary threaded tightener retainer element inside. This element is held frictionally tight in the nut with its threads spaced away slightly from the main threads of the nut. It is preferably swaged into place in such a way as to taper the element towards its longitudinal axis and form a wedge-like pressure on the bolt threads, when the bolt is threaded into it. The element can be tapped slightly smaller in diameter than the thread diameter in the nut.

The object of the invention is to provide a new and improved pressure stop nut for bolts or the like, that will avoid some of the disadvantages and limitations of the previous ones developed.

Another object of this invention is to provide a new and improved pressure stop nut that will be made from conventional nut materials and can be assembled and securely held together in a very simple but effective manner.

A further object of the invention is to provide a new and improved pressure stop nut that can be made in an adjustable form to fit various nut and bolt conditions.

A further object of this invention is to provide a new and improved stop nut that will have an element adjustably positioned in the nut so it may have its frictional contact with a bolt threaded variably adjusted to suit predetermined requirements.

Other objects of the invention will be indicated as the details of its structure are outlined.

For an adequate understanding of the invention, its objects, principles and operation, reference is made to the accompanying drawings. One drawing when used in conjunction with the following description will help to explain a particular form of the invention by way of example, while the claims emphasize the scope of the invention.

In the drawings.

Similar reference numerals relate to the same parts throughout the figures.

Figure 1:
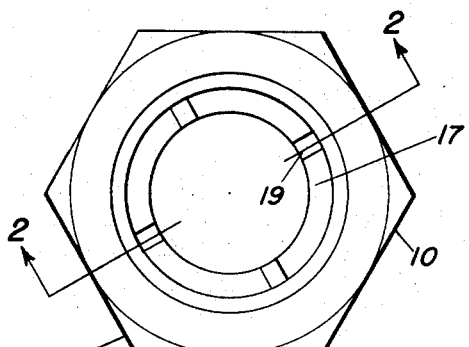
Figure 1 is a plan view of a stop nut embodying this invention.
Figure 2:
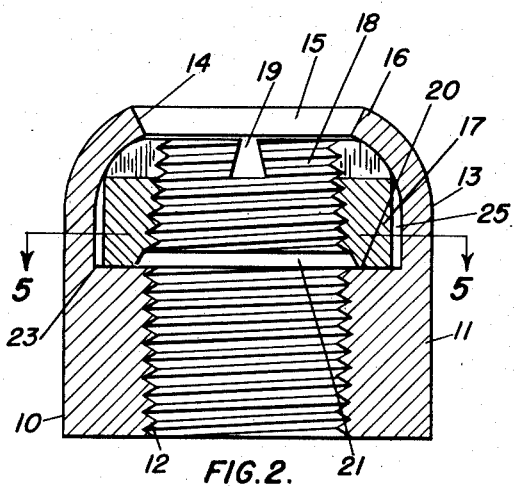
Figure 2 is an enlarged sectional view taken on line 2—2 of Figure 1.

In the construction shown in Figures 1 and 2, a stop nut comprises a shell 10 having its lower body portion 11 hexagonal externally and internally screw threaded at 12 for placement on a threaded bolt or the like. The upper body portion 13 rises from the body 11 and is enlarged interiorly to form a chamber at 25 and unthreaded. It is plain in surface, with a circular axial opening 14 through its wall 15 that is larger than the bolt used to pass through it. Normally the wall 15 continues in circular or cylindrical contour, both interiorly and exteriorly to permit the placement of a cylindrical pressure element 17, easily or loosely, therein so that the pressure element is axially movable to a certain extent in chamber 25. After the element is in place, it is held securely in chamber 25 by the bending over of the upper rim 16 of the body portion 13 in a swaging-like manner as shown in Figure 2 or may be like that shown in Figure 4. When the bolt is threaded through the element 17, the latter rides on the lower faces of the bolt threads until it strikes the swaged in rim 16 of the shell 10. This screwing sets up stresses in the bolt. When, however, the element 17 strikes the rim 16 and screwing of the bolt is continued, the element is forced downwardly so that it now rides on the upper faces of the bolt threads. The net result of this action is to relieve the bolt stresses, while, due to the provision of slots 19, the element 17 maintains its grip on the bolt. The resistance of the gripping element on the bolt is increased or decreased by lowering or raising the rim 16 since the location of the rim controls the extent of axial movement of the element. The element is preferably provided with angularly cut slots 19, four in number, 90° apart, adjacent to its upper edge in order to make this portion of the element more flexible and more easily bent and tapered. The element is also rounded preferably at this upper peripheral edge to make it easier to bend the upper rim 16 to form the wall 15 over it, to the right contour as well as to increase the friction therebetween as indicated in Figure 2. The internal screw-threading 18 may be of smaller diameter than that used for the nut and does not come flush with the lower face 20 of the element but is limited to allow a space with a bevelled face 21 in between the threads 18 of the element 17 and the threads 12 of the nut 11, so the threads in the element and nut may be aligned more readily. This distance of the space 21 is approximately the distance taken up by a half to a whole thread pitch space of the components involved depending on the diameter of the nut.

When the stop nut is applied to a bolt, its lower portion 11 is screwed on the end portion of the bolt and then beyond, until the bolt reaches the threads 18 on the element 17. The grip ring element is tightened thereon until the threads of both are wedged tight on the bolt. When the bolt approaches the tapered portion of the grip ring and threads adjacent the slots 19, it binds resiliently thereon. The spaces provided by the slots actually divides the upper rim of the element into a series of lugs, and these lugs independently bind on the threads of the bolt without any appreciable or detrimental restraint by the rest of the body of the element. The slots 19 may be omitted under certain conditions, depending on the amount of resistance to be overcome by the nut against loosening. The face 20 of the element 17 is flat and rests on the flat surface 23 of the nut interior and creates a friction which when added to the friction set up through contact of the inner face of the rim 16 and portion of element 17 determine the amount of torque for which the nut is capable of operating.

Figure 3:
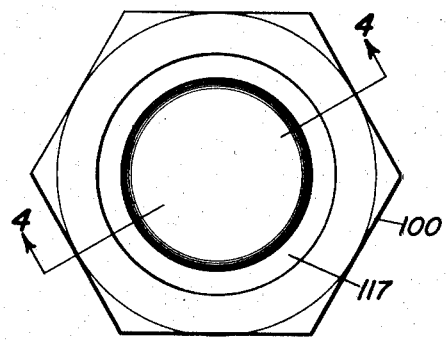
Figure 3 is a plan view of a modified form of the stop nut.
Figure 4:
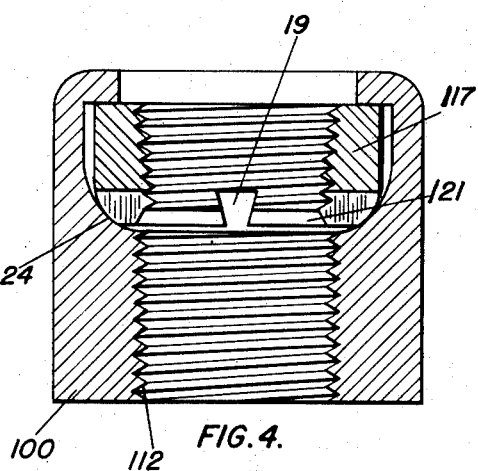
Figure 4 is a sectional view taken on line 4—4 of Figure 3.
Figure 5:
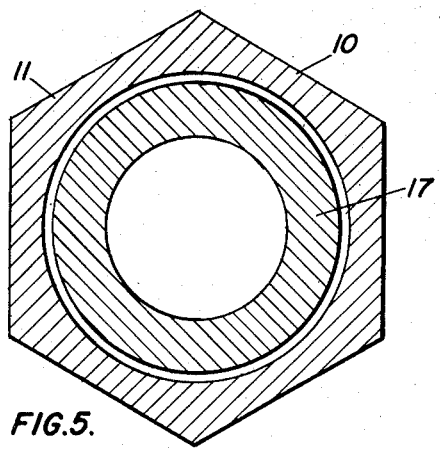
Figure 5 is a sectional view taken on line 5—5 of Figure 2.

In Figures 3 and 4, the modified form employs a similar shell 100 with the space for the element 117 rounded at the lower corner 24 instead of the upper corner shown in Figure 2, where the swaging over of the upper rim is rounded instead of flat. The element in Figure 4 is inverted so as to bind on the bolt as it passes through the nut threads 112 close to the bottom of the element surface. This is quicker acting than the previous arrangement, but otherwise the general features of the stop nut in this form, are the same. The space with a bevelled face 121 is at the rounded portion of element. The rim of the wall 15 is also bent over in the modified form, but not in a rounded form because the bottom contour of the element does not have a rounded form in this position. It is to be appreciated that the term bolt, is intended to cover any general type of bolt or screw.

While but two general forms of the invention are shown in the drawings and described in the specifications, it is not desired to limit this application for patent to these particular forms, as it is appreciated that other forms could be made that would use the same principles and come within the scope of the appended claims.

Having thus described the invention, what is claimed is:

1. In a nut of the class described, the combination of a nut body having an internally threaded axial opening, said nut body having an enlarged chamber at one end of said opening, a solid cylindrical pressure element rotatably in said chamber independently of the nut body and having an internally threaded axial opening aligned with the first mentioned opening, said pressure element having threaded flexible portions depending therefrom, and cooperating wall surfaces between the aforesaid chamber and the flexible portions to enforce gripping of the said portions on the bolt threaded through the aligned openings, said surfaces including an upper abutment in said chamber, said pressure element riding upwardly on the bolt within the chamber when the bolt is threaded therethrough until the element contacts the aforesaid upper abutment, the element then being forced downwardly on the bolt by said abutment upon further threading of the bolt relieving stresses in the bolt while maintaining the grip of the element on the bolt.

2. The nut described in claim 1, wherein the cooperating surfaces between the chamber and the flexible portions of the pressure elements are curved and are located at the upper end of the chamber.

3. The nut described in claim 1, wherein the cooperating surfaces between the chamber and the flexible portions of the pressure elements are curved and are located at the lower end of the chamber.

4. The nut described in claim 1, wherein the flexible portions of the pressure element consist of axial extensions from the body of the solid element separated by a plurality of transverse slots.

HIRAM R. HARDING.

REFERENCES CITED

The following references are of record in the file of this patent:

UNITED STATES PATENTS

| Number | Name | Date |
| --- | --- | --- |
| 1,257,202 | Emery | Feb. 19, 1918 |
| 2,320,032 | Danforth | May 25, 1943 |
| 2,324,731 | Simmonds | July 20, 1943 |
| 2,333,290 | Brackett | Nov. 2, 1943 |
| 2,363,680 | Luce | Nov. 28, 1944 |
| 2,386,307 | Giles | Oct. 9, 1945 |
| 2,389,377 | Manning | Nov. 20, 1945 |